United States Patent [19]

Castelaz

[11] Patent Number: 5,206,916
[45] Date of Patent: Apr. 27, 1993

[54] MODULAR CELLULAR AUTOMATION FOR LINE ASSOCIATION AND IDENTIFICATION

[75] Inventor: Patrick F. Castelaz, Yorba Linda, Calif.

[73] Assignee: Hughes Aircraft Company, Los Angeles, Calif.

[21] Appl. No.: 796,290

[22] Filed: Nov. 22, 1991

[51] Int. Cl.⁵ .............................................. G06K 9/28
[52] U.S. Cl. ....................................... 382/14; 382/27; 382/49; 395/27
[58] Field of Search ...................... 382/14, 15, 27, 28, 382/41, 49, 50; 395/20-24, 26, 27

[56] References Cited

U.S. PATENT DOCUMENTS

| | | | |
|---|---|---|---|
| 3,106,699 | 10/1963 | Kamentsky | 382/27 |
| 4,384,273 | 5/1983 | Ackland et al. | 382/27 |
| 4,547,898 | 10/1985 | Tsikos | 382/27 |
| 5,101,445 | 3/1992 | Call et al. | 382/27 |
| 5,151,953 | 9/1992 | Landeta | 382/41 |

OTHER PUBLICATIONS

"Optimization by Simulated Annealing", by S. Kirkpatrick, C. D. Gelatt, Jr., M. P. Vecchi, *Science,* May 13, 1983, pp. 671-680, vol. 220.

"An Introduction to Computing with Neural Nets", by Richard P. Lippmann, *IEEE ASSP Magazine,* Apr. 1987, pp. 4-22.

*Primary Examiner*—Leo H. Boudreau
*Attorney, Agent, or Firm*—W. K. Denson-Low

[57] ABSTRACT

A modular, cellular automaton system (26) for identifying patterns in multi-dimensional data. The system includes a regular two-dimensional array (40) of interconnected processing cells (44) and data cells (42), wherein each data cell (42) is located at a particular x-y location on a cartesian coordinate system. The system (26) includes a means for accepting the data and for transmitting the data to data cells (42) having x-y coordinate locations which correspond to the coordinates of the data points. The system (26) sums data values surrounding each of the data values and compares the sums with a threshold. Sums are set to zero if the threshold is not exceeded. In an iterative process, the summing and thresholding is repeated until the sum is set to zero or the sum no longer changes on two consecutive iterations. In this way, data cells (42) which remain at nonzero values together form the pattern to be identified in the data.

23 Claims, 4 Drawing Sheets

PROCESSING TIME ESTIMATES

DATA I/O PER LINE-SET:

512∗100nsec = 51 usec
51usec∗2 = 102 usec (incl. OH)

MCA PROCESSING TIME PER LINE-SET:

20∗1usec = 20 usec

MISCELLANEOUS I/O

512∗100 nsec = 51 usec

TOTAL LINE SETS:

(500 LINE-SETS)∗(30 CLASSES) = 15000

TOTAL PROCESSING TIME

102 usec + 20 usec = 122 usec/LINE-SET
15000∗122 usec = 1.83 sec.

ASSUMPTIONS

REQUIREMENTS

- 30 CLASSES
- PER CLASS: 500 "LINE-SETS" OF 10 LINES EA.

NETWORK

- 16 FREQ. X 32 TIME ELEMENTS
  - 512 DATA CELLS
  - 512 PROCESSING CELLS
  - SINGLE CHIP (@ 1 MICRON)
  - 10 IDENTICAL CHIPS
- 1 USEC/CLOCK CYCLE
- 20 CYCLES PER LINE-SET

INTERFACE

- 100 nsec RAM FOR FREQ/TIME DATA

Fig-4

MODULAR CELLULAR AUTOMATION FOR LINE ASSOCIATION AND IDENTIFICATION

BACKGROUND OF THE INVENTION

1. Technical Field

The present invention relates to systems and methods for analyzing patterns present in data, and in particular to a system and method for performing real-time pattern recognition in noisy or cluttered multi-dimensional data.

2. Discussion

Automatic pattern recognition is an important function in many areas of technology. A pattern to be recognized may exist in visible images, or in data from many other sources such as infrared, sonar or in data from non-sensory sources. The pattern recognition task is generally broken down into a number of stages. Low level tasks involve gathering and filtering noise from the raw data. Mid-level tasks generally involve associating, or clustering multiple data points into primitive constructs such as edges, lines, curves, etc. High-level pattern recognition tasks are performed on these constructs to perform further association, classification and identification of the patterns present in the data.

One of the chief difficulties with automatic pattern recognition is the presence of unwanted noise or clutter in the image. Noise may originate from unwanted signal disturbances or imperfections in the sensors. Clutter generally refers to extraneous data having patterns which cause difficulty in separating the desired patterns from this background clutter. It is generally a goal of low and mid-level pattern recognition processing to reduce or eliminate noise and clutter from the data. Once this is done higher level processing involving clustering and enhancing the data can be performed.

A number of systems and methods exist for performing pattern recognition. Conventional approaches include highly CPU intensive line-enhancement algorithms, line detection algorithms, and tree-search algorithms. These typically rely on sequential processing techniques and require explicit signal processing algorithms. However, developing the explicit algorithm and software is often extremely time consuming, and the results are only as good as the algorithm. Thus, where assumptions are made by the developer of the algorithm, the processing will not yield good results for cases where these assumptions do not apply. Further, some problems simply have defied the ability to develop satisfactory algorithms. In addition, sequential processing techniques generally are CPU intensive and often cannot perform processing with the desired speed. Also, such systems often are complex, costly, and not fault tolerant. In addition, techniques relying on explicit algorithms often are limited to narrow classes of problems and new algorithms must be developed to handle different kinds of data, or to handle data from different domains.

Thus, it would be desirable to have a pattern recognition system which does not require explicit algorithm development. Further, it would be desirable to have such a system which can perform pattern recognition at relatively high speeds, which is not CPU intensive. In addition, it would be desirable to have such a system which exhibits a high degree of fault tolerance. Also it would be desirable to have a pattern recognition system which can adapt to new types of data and new classes of problems without extensive modification. Finally, it would be desirable to have a pattern recognition system which does not require complex or expensive hardware.

SUMMARY OF THE INVENTION

In accordance with one aspect of the present invention, a system is provided for associating and identifying patterns in multi-dimensional data. The system utilizes a regular two-dimensional array of interconnected processing cells and data cells, each data cell being located at a particular x-y location in a cartesian coordinate system. An input means is provided for accepting the data, and also for transmitting the data to data cells having x-y coordinate locations which correspond to the coordinates of the data points. A summing means is included for determining the sum of multiple data values surrounding each of said data cells. Also a comparison means for comparing each of the sums with a threshold and for setting the sum equal to zero if said sum is not exceeded. The system also involves an iterating means for repeating the summing and the comparison for each data cell until, the sum is set to zero, or the sum no longer changes on two successive iterations. In this way, data cells which remain that are not set to zero reveal the desired pattern in the multi-dimensional data.

In accordance with another aspect of the present invention, a method is provided for identifying patterns in multi-dimensional data. First, a regular two-dimensional array of interconnected processing cells and data cells is provided. Each data cell is located at a particular x-y location on a cartesian coordinate system. Next, data is transmitted to data cells having x-y coordinate locations which correspond to the coordinates of the data points. Multiple data values surrounding each of said data cells are then summed. Each of said sums is compared with a threshold, and said sums are set to be equal to zero if said threshold is not exceeded. The steps of summing and comparing are then repeated for each data cell until sum is set to zero or no longer changes on two successive repeats. As a result, the data cells which remain that are not set to zero comprise the pattern in said multi-dimensional data.

BRIEF DESCRIPTION OF THE DRAWING

The various advantages of the present invention will become apparent to those skilled in the art after reading the following specification and by reference to the drawings in which:

FIG. 4 is a summary of processing estimates for the performance of the modular, cellular automaton in accordance with the present invention.

DESCRIPTION OF THE PREFERRED EMBODIMENTS

Figure 1:
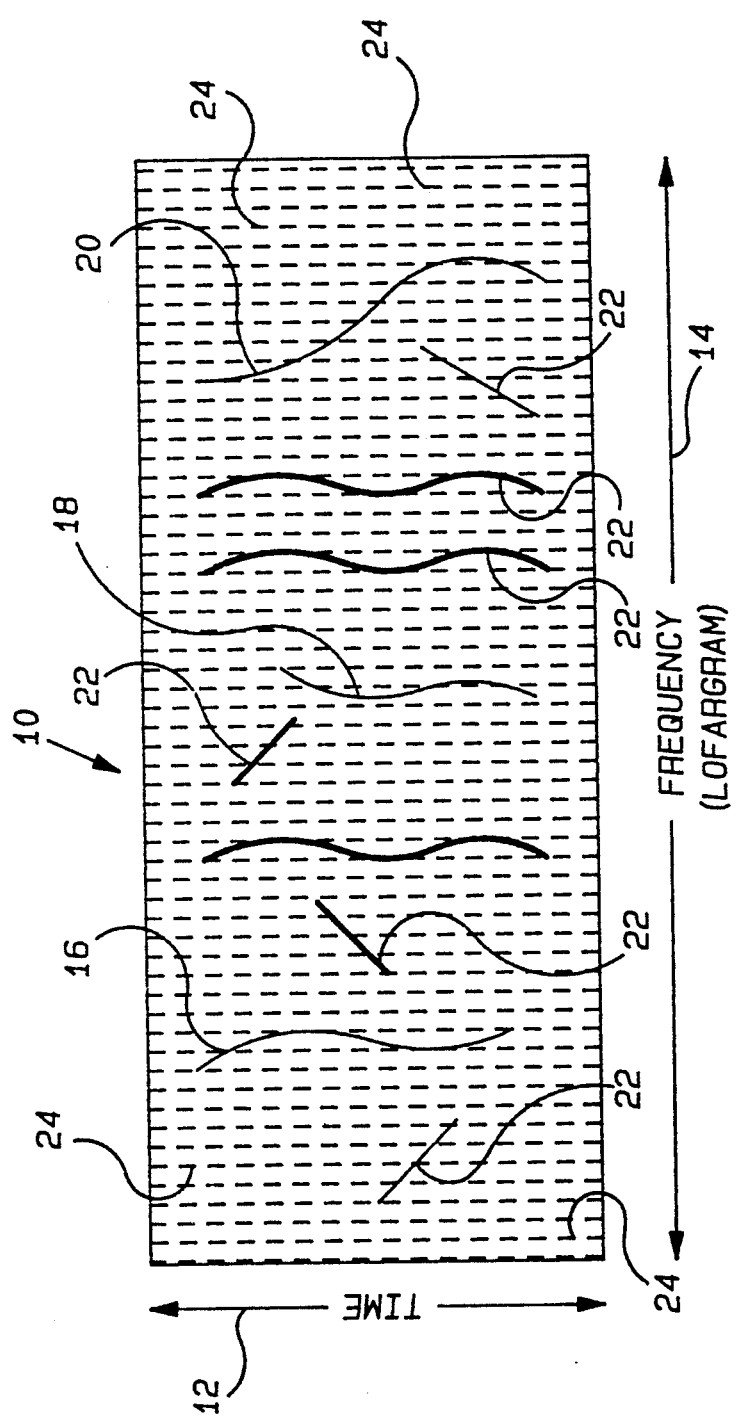
FIG. 1 is a diagram of a pattern recognition problem involving the association of lines in accordance with the present invention.

In accordance with the teachings of the present invention, a system and method is provided for the rapid solution of pattern recognition problems. Referring now to FIG. 1, an example of a pattern recognition problem is shown. In particular, FIG. 1 shows a line association and identification problem. In more detail, time/frequency graph of data 10 produces a pattern of lines. That is, the vertical axis 12 represents time while the horizontal axis 14 represents frequency. Data, in this case sonar data, is plotted on this graph 10, defined as a LOFARGRAM (Low Frequency Amplitude Recording Gram). In this particular example it is desired to determine the presence of vertical, or near vertical, lines existing in three particular frequency bands.

For example, lines 16, 18 and 20 are characteristic of a particular known sonar source. They may be characteristic of sounds generated by the engine or transmission gear train harmonics produced by a particular class of vessel. The other lines 22 are from other sources and alternatively represent clutter in the pattern in the graph 10. Lines 22 may represent lines from different classes of vessels which are desired to be identified and classified separately from lines 16, 18 and 0. In addition, dots 24 represent noise in the signal. It should be noted that FIG. 1 shows the pattern 10 in a relatively idealized manner for ease of illustration. In actual data, lines 16, 18 and 20 may not stand out so clearly against background noise 24 and may also be broken up so that it may not be clear where lines 16, 18 and 20 start and stop.

The pattern recognition problem in general is twofold. The first aspect of the problem is to filter out noise 24 from the image, and also to enhance the lines 16, 18 and 20 where they may be weak or broken up. The second aspect of the problem is to remove clutter 22 and to determine the presence of lines 16, 18 and 20 in predetermined frequency bands, and associate these lines into a "line-set" which will serve to identify the particular class of vessel. It will be appreciated that while the pattern recognition task illustrated in FIG. 1 represents the tasks of recognizing sonar patterns in frequency-time data, the basic problems encountered are virtually identical in many other classes of problems. Those would include similar problems involving visual data, IR data and other two-dimensional data. Further, in these problems the task may be to identify other kinds of patterns such as non-vertical lines or combinations of line orientations, to identify particular objects. Accordingly, the system and techniques of the present invention illustrated as applied to the sonar line association problem are equally adaptable to these and other examples of pattern recognition problems.

Figure 2:
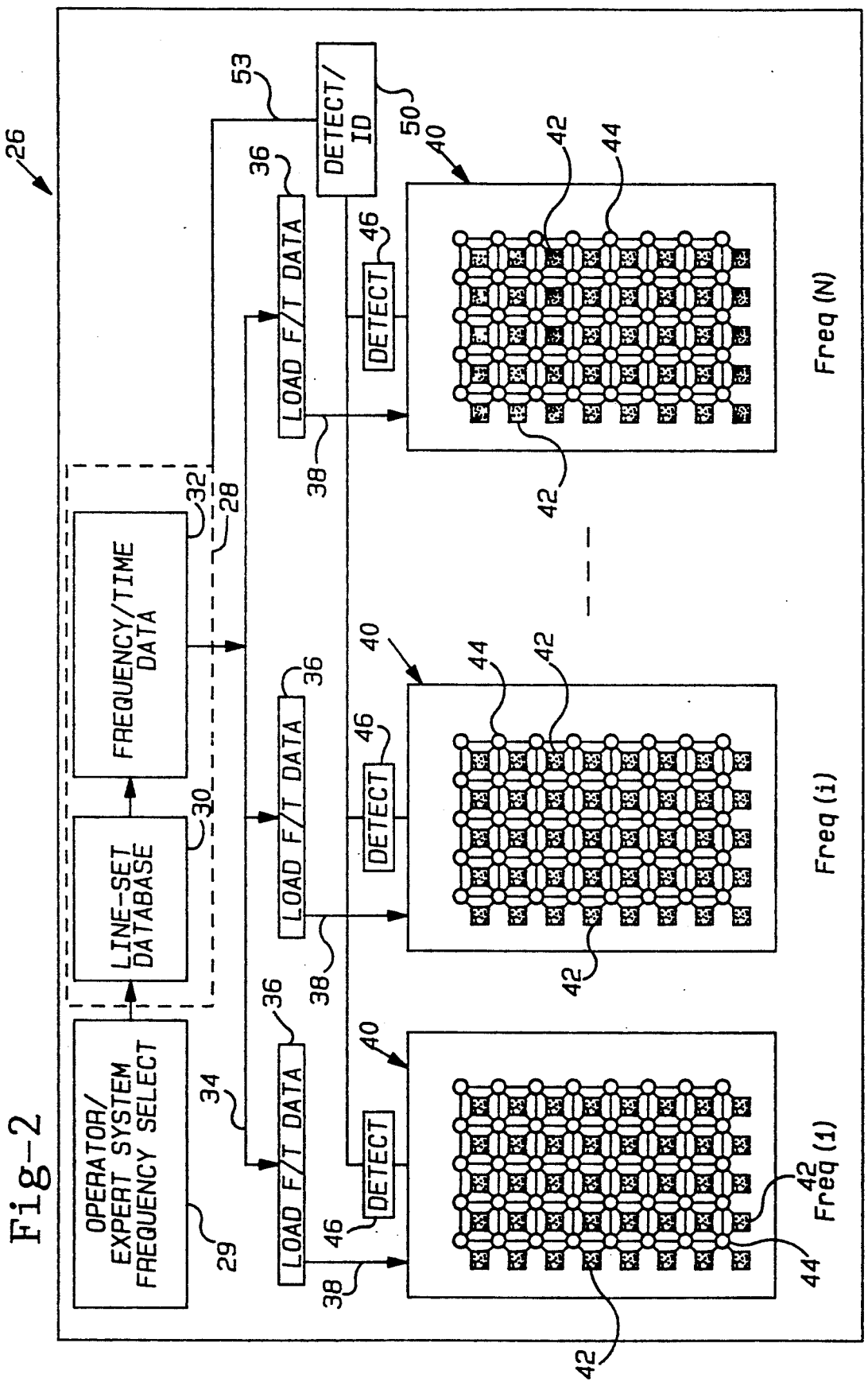
FIG. 2 is a block diagram of a modular, cellular automaton in accordance with the present invention.

Referring now to FIG. 2, a system level description of a modular, cellular automaton (MCA) 26 is shown. A host computer 28 receives data from an input module 28. Input module 28 interfaces with the operator or expert system which selects the frequency bands containing the lines to be detected such as line 16, 18 and 20. The line-set database module 30 in the host 28 stores a known set of line-sets characteristic of particular sources to be detected. The frequency/time data block 32 consists of the raw, or preprocessed data such as the frequency/time data producing the graph 10 shown in FIG. 1. In particular, this data includes frequency/time and amplitude values for each frequency/time coordinate location. This data is then loaded along line 34 into a series of Load F/T data modules 36. There are N Load F/T data modules 36 where the size of N will depend on the size of the problem as will be apparent from the following discussion.

Each Load F/T data module 36 accepts a complete frequency band of the frequency/time data set from module 32 and transfers this portion of the total data along lines 38 to a series of N cellular automaton modules 40. The frequency/time data is mapped into the cellular automaton module 40 in data cells 42. Each data cell 42 has an address location that corresponds to a particular frequency/time value. The mapping of frequency/time data is such that each data point is loaded into a data cell having the same frequency/time address.

Data in the data cell 42 is processed by means of an array of processing cells 44 in accordance with a cellular automaton technique which will be discussed in more detail below. The results of this processing are then transferred to detect modules 46 which in turn are coupled along line 48 to a detect/identification module 50. The detect/ID module 50, in turn is connected to host computer 28 through line 53. As will be apparent in the following discussion, in various embodiments, modifications are possible in which greater or fewer functions of the MCA 26 may be performed by the host 28.

Figure 3:
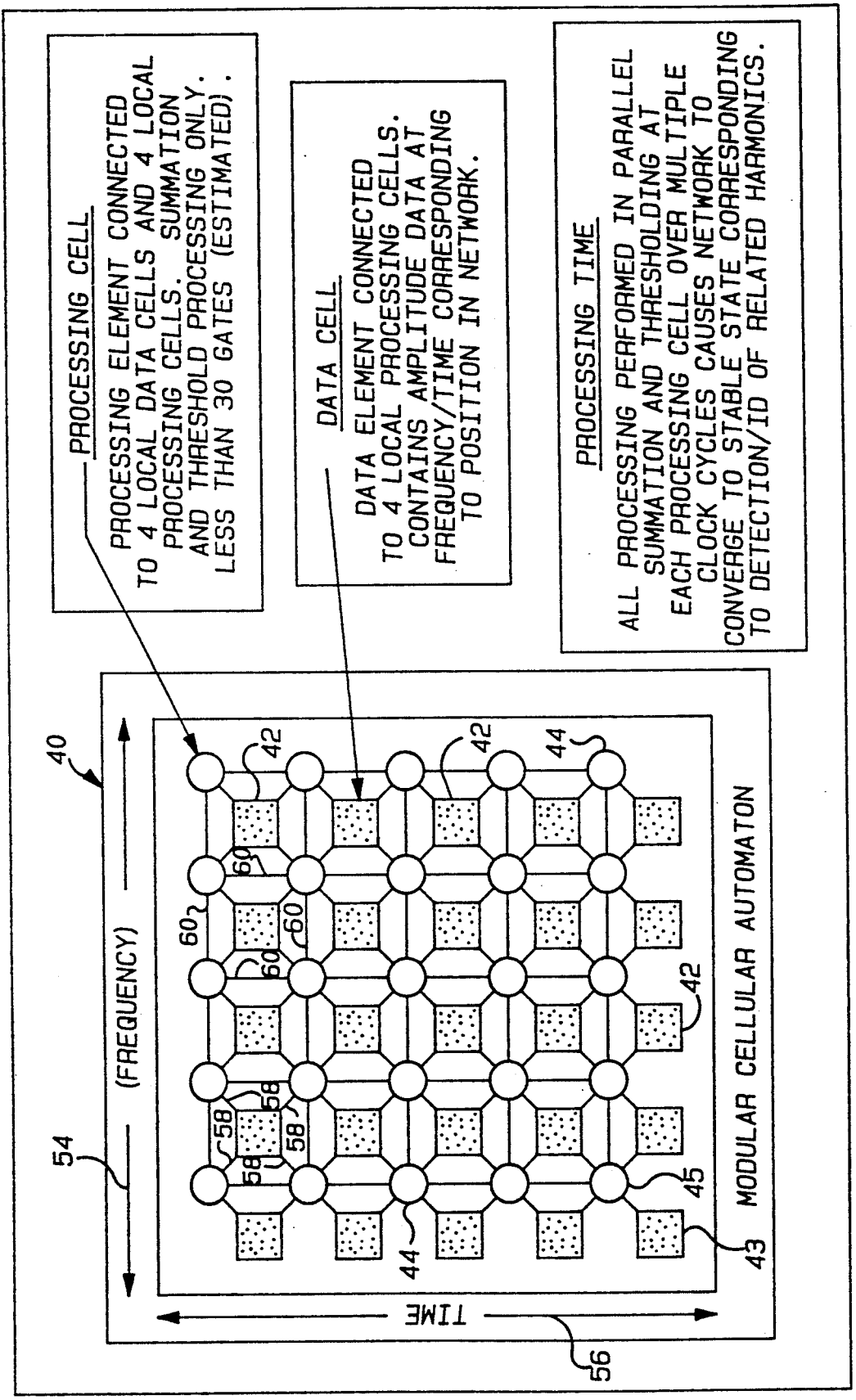
FIG. 3 is a diagram of one of the modular, cellular automaton modules shown in FIG. 2.

Referring now to FIG. 3, one of the cellular automaton modules 40 is shown in more detail. Each cellular automaton module 40 consists of a regular array of interconnected processing cells 44 and data cells 42. The cellular automaton module 40 represents a mapping of frequency/time data where the horizontal axis 54 represents frequency and the vertical axis 56 represents time. Each data cell 44 thus is located at an address which corresponds to unique frequency/time values.

The size of the cellular automaton module 40 can vary depending on the application. It should be noted that one of the chief advantages of the modular cellular automaton system 26 is that it can be scaled to handle different sizes of problems by simply adding additional cellular automaton modules 40 as is illustrated in FIG. 2.

Each data cell 42 is a storage element that is loaded with amplitude data at a particular frequency and time corresponding to that frequency and time address in the cellular automaton module 40. The amplitude data may be normalized, continuous valued data or may be simply binary data. Each data cell 42 is connected by means of diagonal lines 58 to four surrounding processing cells 44.

Each processing cell 44 is also connected to four surrounding processing cells 44 by means of vertical and horizontal lines 60. Each processing cell performs the functions of summation and thresholding. In a hardware circuit, these functions of the processing cells 44 can probably be performed with less than 30 gates. The summation and thresholding for all processing cells is performed in parallel simultaneously during each clock cycle. Over multiple clock cycles the modular cellular automaton 26 will converge to a stable state corresponding to the detection or identification of related line sets.

In more detail, the processing of the MCA 26 involves the following nine steps.

Step 1—Select N frequency bands of interest. (Alternatively, in an image processing application these frequency bands would correspond to image regions). As discussed above in connection with FIG. 2, this step is performed by block 29.

Step 2—Extract frequency/time amplitude values in selected frequency bands for presentation to N cellular automation modules 26. (In the case of image data amplitude values will represent pixel amplitudes and frequency bands will represent image regions.) This step is indicated by block 32 in FIG. 2.

Step 3—Normalize the amplitude data in each frequency band (or image region). While there are many ways to do this—the choice of which would not significantly impact MCA 26 performance—the following is recommended. All data values A(i, j) are scaled relative to Min [A(i,j)] and Max [A(i, j)] in the frequency band (or image region) in which it resides. i corresponds to the frequency or x axis value; j refers to the y or time axis and the Min and Max are determined over all i, j. In particular, data may be normalized according to the equation:

$$A(i,j)_{normalized} = Scale \times \{A(i,j) - Min[A(i,j)]\} / \{Max[A(i,j)] - Min[A(i,j)]\}$$

This will scale all data values to be within the range [0, Scale]. The value "scale" is selected to correspond to the resolution constraints of the specific implementation. This step is performed in host 28.

Step 4 Load the normalized amplitude data into each cellular automaton module 40. There will be one cellular automaton module 40 for each frequency band (or image region). Step 4, as indicated in FIG. 2, is performed in interface modules labeled load F/T data 36.

Step 5 Process all data simultaneously in all cellular automaton modules 40. Specific details of this step will be described below. This step is performed entirely by the cellular automaton modules 40.

Step 6 Retrieve results from cellular automaton module 40. That is, results are passed from each cellular automaton module 40 to the detect modules 46 and passed along line 48 to Detect/ID module 50.

Step 7 Detect lines (or shapes). In this step, pattern matching is performed in which M contiguous (or nearly contiguous) "on" cells ([JPLOT=1], See detailed description of Step 5 below) indicate a line at a particular orientation (or an arbitrary shape) depending on the templates used for matching. There may be more than one line (or shape) per cellular automaton module 40. For example, a vertical line would indicate the presence of a given frequency component over some duration of time as shown in FIG. 1. In an image processing example, a rectangular or oval shape would indicate a particular object in the image region. The templates used for matching consist of pre-stored sets of shapes of selected sizes and orientations. These shapes would be typically represented by 2-D patterns of pixel data stored in host memory. As shown in FIG. 2, step 7 may be performed by a combination of detect modules 46 and detect/id module 50.

Step 8 Identify line (or shape) associations. Pattern matching is now performed at the next level "up". Specific combinations of lines (or shapes) from multiple cellular automaton modules 40 are now compared against known templates to identify the presence of sources which generate multiple lines. This may be done for example, in the detect/id module 50, or alternatively by the host 28. For example, the known templates (described above) may correspond to multiple harmonics from a vessel engine/transmission gear train which results in associated frequency-time lines such as lines 16, 18 and 20 in FIG. 1. In an image processing example, a complex image may have groups of similar (or different shapes) in predefined regions of the image. In both cases, this identification using data from multiple cellular automaton modules 40 will allow the identification of a pattern which exists in a region larger than any one module could accommodate. This is an inherent capability of the MCA 26 architecture which enables scaling to handle any size problem. It should be noted that in some cases lines will cross over form one module 40 to another. One way to avoid this (i.e., to cover case where lines cross over), is to "re-map" frequency bins by sliding the entire set of data one bin to the right, where the end-bin would become bin 1, in a circular shift fashion. Then perform the entire process again. Then shift. Then perform the entire process, etc., a maximum number of times corresponding to the longest expected horizontal projection of "crossing" line. Another way to handle this is to allocate frequency bands to modules 40 in a way that avoids chopping up our desired frequency ranges for line sets.

Step 9 Retrieve identification data and associated results for post processing as desired. This will typically be performed by the host 28. Post processing may include computation of ID confidence levels as a function of the goodness of the template matches and other available information (e.g. SNR, etc.).

The following is a step-by-step description of the 17 steps performed at the cell level within each cellular automaton module 40 in the MCA 26. This description comprises an explanation of the processing flow performed in step 5 of the above described nine step functional flow of the MCA 26.

It should be noted that the functions below are best implemented in a two dimensional hardware lattice architecture such as described in FIG. 3, they may also be performed in other ways utilizing other kinds of hardware, software, or combinations of the two. The following description will describe the steps performed by each processing cell 44 shown in FIG. 3 on an associated data cell 42.

| Nomenclature: | Subscript (i,j) points to cell (i,j) in the MCA module, where: Subscript "i" is a column (or row) pointer. Subscript "j" is a row (or column) pointer. |
|---|---|

For example Processing Cell labeled 45 in FIG. 3 corresponds to Processing Cell (1,1) such as LA (1,1); Data Cell labeled 43 corresponds to Data Cell (1,1), such as IA (1,1).

| Step A | For all (i,j): Set IA(i,j) = JA(i,j) = KA (i,j) = LA(i,j) = JPSAV(i,j) = 0. |
|---|---|
| Step B | For all (i,j): Set IA(i,j) = Frequency/Time (or pixel) data provided by host. |
| Step C | For all (i,j): For each cell (i,j), sum north, east, south, west neighbor values: Set LA(i,j) = p1*JA(i-1,j) + p2*JA(i,j-1) + p3*JA(i+1,j) + p4*JA(i,j + 1), where p1, p2, p3, p4 are arbitrary scalers. For this step $p_i$ is, typically equal to 1. |
| Step D | For all (i,j): Set JA(i,j) = LA(i,j). |
| Step E | Over all (i,j): Find MIN[JA(i,j)] and MAX[JA(i,j)]. |
| Step F | Define threshold: THRESH = SCL*MAX[JA(i,j)]. (Typical SCL<1.0). |
| Step G | Clear "completion-flag" IDONE = 0. |
| Step H | For all (i,j): For each cell (i,j), sum north, east, south, west neighbor values: Set LA(i,j) = p1*JA(i-1,j) + p2*JA(i,j-1) + p3*JA(i+1,j) + p4*JA(i,j+1), where p1, p2, p3, p4 are are arbitrary scalers. For this step, $p_i$ typically <>1. |
| Step I | For all (i,j): Re-normalize LA to account for p1, p2, p3, p4: Set SUM = p1 + p2 + p3 + p4 Set LA(i,j) = LA(i,j)/SUM. |
| Step J | For all (i,j): For each cell (i,j), sum north, east, south, west neighbor values again, in order |

|        | -continued |
| --- | --- |
|        | to help "connect" broken lines:<br>Set KA(i,j) = q1*LA(i-1,j) + q2*LA(i,j-1) +<br>q3*LA(I+1,j) + q4*LA(i,j+1).<br>where q1, q2, q3, q4 are arbitrary scalers (may be<br>equal to p1, p2, p3, p4). For this step, qi<br>typically <>1. |
| Step K | For all (i,j): Re-normalize LA to account for q1,<br>q2, q3, q4:<br>Set SUM = q1 + q2 +q3 + q4<br>Set JA(i,j) = KA(i,j)/SUM. |
| Step L | For all (i,j): Threshold each cell:<br>IF JA (i,j) > THRESH THEN<br>   JA(i,j) = JA(i,j)*SCLO<br>   (SCLO typ. > 1.0, say 1.2)<br>ELSE<br>   JA(i,j) = 0.<br>END IF<br>Alternatively, perform this thresholding<br>function only on those cells<br>corresponding to known ("target") cell<br>locations (e.g., known frequency lines,<br>or only those frequently lines of<br>interest). In a massively parallel<br>hardware implementation, in which all<br>processing is performed simultaneously,<br>this may offer no advantage, and in fact<br>may complicate the hardware. However,in<br>a software, or hybrid software/vector<br>processor<br>implementation,<br>this may improve processing<br>efficiency (speed<br>and memory). |
| Step M | For all (i,j): Scale-down the cell value to aid<br>convergence and to avoid uncontrolled increase:<br>Set JA (i,j) = JA(i,j)*SCL1 (SCL1 typ. < 1.0, say<br>0.9) |
| Step N | For all (i,j): Check for presence of a line-<br>segment in the neighborhood:<br>IF JA(i,j) > THRESH2 THEN<br>   JP(i,j) = 1<br>ELSE<br>   JP(i,j) = 0<br>END IF<br>Where THRESH2 is an arbitrary scaler, typically =<br>0. |
| Step O | For all (i,j): Check for change in cell "state"<br>JP(i,j):<br>IF JP(i,j) ≠ JPSAV(i,j) THEN<br>   Set "completion-flag"<br>   IDONE = 1. |
| Step P | For all (i,j): Set JPSAV(i,j) = JP(i,j). |
| Step Q | For all (i,j): Check for completion: No changes<br>in any cells since last iteration:<br>IF IDONE ≠ 0 THEN<br>   Repeat STEPS [G] through [Q].<br>ELSE<br>   MCA module processing is<br>   complete.<br>   Ready to provide results to<br>   host.<br>END IF |

It should be noted that IA(i,j) data resides at interstices between processing cells 44. Note that most of the steps, in particular, steps C—O, refer to processing in the processing cells 44. Prior cells communicate directly N, E, W, S, (North, East, West and South) via connections with sufficient bandwidth to carry information such as JA, KA data. For example, this connection may be 8 bit parallel in all four directions with handshaking/protocols imbedded in the processor.

It should be noted that boundary processing cells 44 will yield incorrect results. To correct for this, one should either discard their results or allow for this by appropriate oversizing of the array for a given data array size, or alternatively, use different logic in these cells. In the preferred embodiment, the MCA is oversized by one bin both horizontally and vertically and in column and end row processing cell results are ignored.

It will be appreciated that using known cellular automaton techniques, the 17 steps above can be performed by the processing cells 44 and data cells 42 interconnected as shown in FIG. 3. For further details of these techniques, refer to *Essays On Cellular Automaton*, Edited by W. Burks, Univ. of Ill. Press, 1970, Library of Congress No. 71-83547, which is hereby incorporated by reference. Alternatively, the steps performed by the MCA 26 can be simulated in a completely software embodiment. Qualitatively, the 17 steps of the cellular automaton modules 40 will result in certain cells being in an "on state" and certain cells being in an "off state". The on state cells will correspond to line segments or shapes such as those shown in FIG. 1. In the course of this processing, noise 24 will be eliminated, broken line segments will be connected and clutter will be reduced. In particular, the cellular automaton module 40 does this by using input data (44) (i.e., IA(i, j) to initialize the states of locally-connected processing cells (42). After this initialization, each processing cell (42) computes intermediate results using local data, and provides these results to its local neighbor (N,E,W,S) for use in their computation, repetitively in an iterative manner. This local interconnect scheme allows all cells to perform their operations completely in parallel simultaneously.

The architecture results in a processing mechanism which quickly eliminates lone data cells (primarily caused by noise or clutter detected by the sensor), while retaining and propagating structured data (multiple neighboring "on" pixels) to connect nearby broken lines. This propagation behavior is typical of behaviors exhibited by even the simplest Cellular Automatons. (See the above-cited reference by Burks (p. 11)). Information is essentially diffused bucket-brigade style (controlled by the specific state-change algorithm embedded in the individual processing cells), to neighboring cells and thence to neighboring neighborhoods.

Referring now to FIG. 4, there is shown a table of assumptions and time estimates for the MCA 26. The assumptions include requirements that there are 30 classes which may be for example, classes of line sets associated with sonar sources. There are one hundred lines per class. Each class will have 500 "line sets" of 10 lines each. The network assumptions for the cellular automaton modules 40 are that there are 16 frequency x 32 time elements in each cellular automaton module 40. This results in 512 data cells and 512 processing cells. Ten identical chips are used to implement each cellular automaton module 40, each chip having one micron geometries. The MCA 26 will have a clock cycle of one micro second and will require 20 cycles per line set. The interface will require 100 nanoseconds by RAM used for processing frequency/time data.

Given these assumptions, a number of processing time estimates can be made as shown in FIG. 4. OH refers to overhead and housekeeping functions. The result of these estimates is a total processing time of 1.83 seconds. This is faster than typical sequential processing techniques by over three orders of magnitude, corresponding to 512 cells on 10 chips outputting completely in parallel.

In accordance with the forgoing description, it can be seen that the MCA 26 is able to solve broad classes of pattern recognition tasks for large sets of data very rapidly. The system requires minimal algorithm development and can be implemented in relatively simple fault tolerant hardware. The regular architecture of the cellular automaton modules 40 results in high speed, low complexity and low cost. The use of separate cellular automaton module 40 results in easy scaleability. The system can also be applied to many classes of pattern recognition problems with minimal reconfigurement. While the above description constitutes the preferred embodiment of the present invention, it will be appreciated that the invention is susceptible to modifications, can be made without departing from the proper scope and fair meaning of the accompanying claims.

What is claimed is:

1. A system for identifying patterns in multi-dimensional data, said system comprising:
   a regular two-dimensional array of interconnected processing cells and data cells, each data cell being located at a particular x-y location on a cartesian coordinate system;
   input means for accepting said data, and also for transmitting said data to data cells having x-y coordinate locations which correspond to the coordinates of the data
   summing means for determining the sum of multiple data values surrounding each of said data cells;
   comparison means for comparing each of said sums with a threshold and for setting said sum equal to zero if said threshold is not exceeded; and
   iterating means for repeating said summing and said comparison for each data cell until said sum is set to zero or said sum no longer changes on two successive iterations, whereby said data cells which remain that are not set to zero comprise said pattern in said multi-dimensional data.

2. The system of claim 1 wherein said summing means sums four data values surrounding said data cell.

3. The system of claim 1 wherein each of said processing cells contains one of said summing means, comparison means, and iteration means.

4. The system of claim 2 further comprising a second summing means for summing the four sums obtained for said neighboring data cells.

5. The system of claim 1 further comprising normalizing means for normalizing said multi-dimensional data.

6. The system of claim 1 further comprising means for scaling said data values prior to summing said surrounding data cells.

7. The system of claim 1 wherein said threshold is proportional to the maximum of said sums obtained by said summing means for all of said data cells.

8. The system of claim 1 further comprising scaling down means for reducing said sum during each iteration whereby uncontrolled increases are avoided.

9. The system of claim 1 further comprising multiple interconnected modules, each of said modules including identical sets of said processing cells, data cells, input means, summing means, comparison means, and iteration means, wherein different portions of said multi-dimensional data are received and processed by each of said modules.

10. The system of claim 1 wherein said multi-dimensional data comprises frequency, time and amplitude data, and frequency is represented as said x coordinate and time is represented as said y coordinate and said data values in said data cells are amplitude values.

11. The system of claim 1 wherein said multi-dimensional data comprises image data including x coordinate, y coordinate and intensity values, wherein said data values in said data cells are intensity values.

12. The system of claim 1 further comprising a host processor including means for normalizing said data, means for comparing continuous patterns of said sums to predetermined positions representative of a known data structure to determine if said known data structure is present in said multi-dimensional data.

13. The system of claim 12 wherein said data structure consists of generally vertical lines occurring at predetermined x coordinate ranges.

14. The system of claim 1 wherein said data structure consists of predetermined shapes.

15. A method for identifying patterns in multi-dimensional data, said method comprising:
   providing a regular two-dimensional array of interconnected processing cells and data cells, each data cell being located at a particular x-y location on a cartesian coordinate system;
   transmitting said data to data cells having x-y coordinate locations which correspond to the coordinates of the data points;
   summing multiple data values surrounding each said data cells;
   comparing each of said sums with a threshold;
   setting said sums equal to zero if said threshold is not exceeded; and
   repeating said summing and said comparing for each data cell until said sum is set to zero or said sum no longer changes on two successive repeats, whereby data cells which remain that are not set to zero comprise said pattern in said multi-dimensional data.

16. The method of claim 15 wherein said step of determining the sum of multiple data values surrounding each of said data cells sums four data values surrounding said data cells.

17. The method of claim 15 wherein said processing cells performs said steps of summing, comparing and repeating.

18. The method of claim 16 further comprising the step of summing the four sums obtained of said neighboring data cells.

19. The method of claim 15 further comprising the step of normalizing said multi-dimensional data.

20. The method of claim 15 further comprising the step of scaling said data values prior to summing said surrounding data cell.

21. The method of claim 15 wherein said threshold is proportional to the maximum of said sums obtained for all of said data cells.

22. The method of claim 15 further comprising the step of scaling said sums during each repeat to avoid uncontrolled increases.

23. The method of claim 15 wherein said multi-dimensional data comprises frequency, time and amplitude data, and frequency is represented on said x coordinate and time is represented on said y coordinate, and said data values in said data cells comprise amplitude values.

* * * * *